(12) United States Patent
Sebastian et al.

(10) Patent No.: US 10,836,466 B2
(45) Date of Patent: Nov. 17, 2020

(54) TOROIDAL PROPELLER

(71) Applicant: Massachusetts Institute of Technology, Cambridge, MA (US)

(72) Inventors: Thomas Sebastian, Maynard, MA (US); Christopher Strem, Ellicott City, MD (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/803,961

(22) Filed: Nov. 6, 2017

(65) Prior Publication Data
US 2019/0135410 A1    May 9, 2019

(51) Int. Cl.
| | | |
|---|---|---|
| *B64C 11/00* | (2006.01) | |
| *B64C 11/18* | (2006.01) | |
| *F01D 5/14* | (2006.01) | |
| *F01D 5/16* | (2006.01) | |
| *B64C 11/20* | (2006.01) | |
| *B64C 11/02* | (2006.01) | |
| *B64C 39/02* | (2006.01) | |

(52) U.S. Cl.
CPC ............ *B64C 11/008* (2013.01); *B64C 11/18* (2013.01); *B64C 11/20* (2013.01); *F01D 5/141* (2013.01); *F01D 5/147* (2013.01); *F01D 5/16* (2013.01); *B64C 11/02* (2013.01); *B64C 39/024* (2013.01); *B64C 2201/108* (2013.01); *B64C 2201/162* (2013.01); *F05D 2240/307* (2013.01)

(58) Field of Classification Search
CPC ....... B64C 11/008; B64C 11/18; B64C 11/20; B64C 11/02; B64C 39/024; B64C 2201/108; B64C 2201/162; F01D 5/147; F05D 2240/307
See application file for complete search history.

(56) References Cited

U.S. PATENT DOCUMENTS

| | | | |
|---|---|---|---|
| 4,445,817 A | 5/1984 | Wethem | |
| 4,973,225 A * | 11/1990 | Kruppa | .................. B63H 3/082 416/157 R |
| 5,096,382 A | 3/1992 | Gratzer | |
| 6,736,600 B1 * | 5/2004 | Bannasch | ................ B63H 1/26 416/129 |
| 9,926,058 B2 | 3/2018 | Sharrow | |
| 2014/0161622 A1 | 6/2014 | Sharrow | |
| 2017/0218772 A1 | 8/2017 | Sharrow | |
| 2018/0186439 A1 | 7/2018 | Sharrow | |
| 2018/0237122 A1 | 8/2018 | Sharrow | |

OTHER PUBLICATIONS

Christian, A., et al., "Initial investigation into the psychoacoustic properties of small unmanned aerial system noise," presented at 17th AIAA Aviation Technology, Integration, and Operations Conference (Aviation 2017); Jun. 5-9, 2017; Denver, CO; United States <https://ntrs.nasa.gov/search.jsp?R=20170005870> pp. 1-21.
Ehret, G., "Age-dependent hearing loss in normal hearing mice," Naturwissenschaften, Nov. 1974, vol. 61, Issue 11, pp. 506-507.

* cited by examiner

*Primary Examiner* — Hieu T Vo
(74) *Attorney, Agent, or Firm* — Nutter McClennen & Fish LLP

(57) ABSTRACT

The propeller includes a hub supporting a plurality of elongate propeller elements in which a tip of a leading propeller element curves into contact with a trailing propeller element to form a closed structure with increased stiffness and reduced acoustic signature.

12 Claims, 8 Drawing Sheets

Total $R^2$=0.82
Car Offset = -5.64[dB]

TOROIDAL PROPELLER

This invention was made with Government support, under Contract No. FA8702-15-D-0001 awarded by the US Air Force. The government has certain rights in the invention.

BACKGROUND OF THE INVENTION

This invention relates to a toroidal propeller having higher thrust per unit power along with a significant reduction in acoustic signature than is achievable with conventional propeller designs.

Multirotor drones rely entirely on the thrust generated by propellers both to stay aloft and to maneuver. The mechanical simplicity of these platforms drives their adoption in the commercial sector for a range of applications—cinematography, industrial inspection, airborne monitoring, aerial delivery, and even air taxis. However, recent psychoacoustic experiments conducted by NASA Langley on human test subjects shows that while overall annoyance to noise increases with sound level, small multirotor drones generate a high annoyance level at a given sound level than do road vehicles. See FIG. 1 that compares a time integrated A-weighted sound energy metric to perceived annoyance.

The primary noise sources for these multirotor drones are brushless DC motors and the aerodynamic noise generated by the propellers driven by those motors. Public acceptance of multirotor drones is critical to their widespread use; acoustically quieter propeller designs that are able to serve as drop-in replacements for conventional propellers may, more than any other technological advancement, accelerate the acceptance and wide use of drones in public spaces.

Closed form or box wings have been investigated in the past as a method to reduce losses associated with tip vortex generation while also enhancing the structural integrity of the wing. Investigators at the Massachusetts Institute of Technology Lincoln Laboratory have studied the aerodynamic feasibility of so-called ring wings, wherein the tips of two lifting surfaces are linked via a lofted surface to generate a non-planar closed structure. This research demonstrated lift-to-drag ratio improvements of a ring wing relative to a comparable planar wing of 40-60% as shown in FIGS. 2a and 2b derived from interactions between lifting surfaces and a significant reduction in the strength of the trailing tip vortex, a key source of aerodynamic noise.

With reference now to FIGS. 3a, 3b and 3c, example prior art propellers are shown. FIG. 3a is a design disclosed in U.S. Pat. No. 4,445,817. FIG. 3b is a shrouded propeller design from U.S. Pat. No. 5,096,382. FIG. 3c, described in U.S. Pat. No. 6,736,600, is somewhat similar to the design disclosed in this patent application. The design in FIG. 3c utilizes a split propeller design wherein each blade is split at an arbitrary distance from the main propeller hub and extended forward and aft with respect to the propeller rotation direction.

SUMMARY OF THE INVENTION

The toroidal propeller of the invention includes a hub supporting a plurality of elongate propeller elements in which a tip of a leading propeller element curves into contact with a trailing propeller element to form a closed structure with increased stiffness and reduced acoustic signature. A preferred embodiment includes two or more propeller elements, with number of elements dictated by desired propeller responsiveness, propeller diameter, and material properties.

DESCRIPTION OF THE PREFERRED EMBODIMENT

The disclosed toroidal propeller is an extension of a non-planar box wing with the tip of each curved propeller element extending into each trailing propeller element. This design allows for a more manufacturable design while improving overall aerodynamic performance and reducing acoustic signature.

Variations on a three-bladed toroidal propeller were designed and fabricated using additive manufacturing techniques along with corresponding (i.e., utilizing the same airfoil cross section and twist distribution, number of propeller elements, and propeller diameter) conventional propellers designed and fabricated as well as shown in FIGS. 4a-4f.

Figure 1:
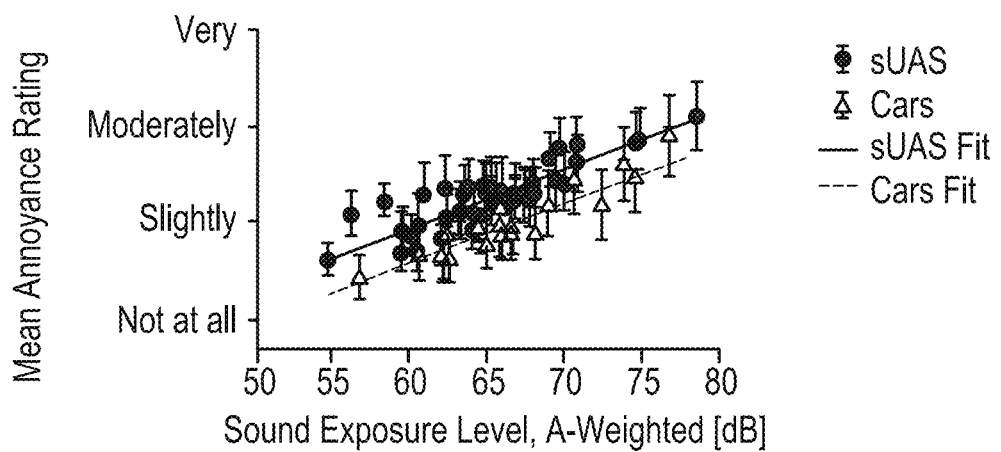
FIG. 1 is a graph of mean annoyance rating against sound exposure level, A-weighted.
Figure 2A:
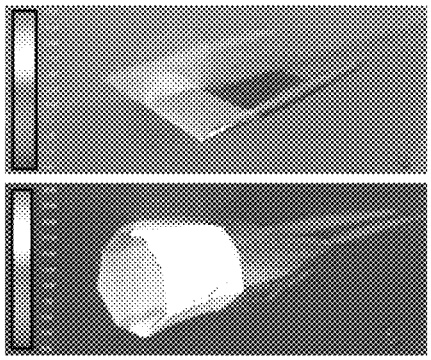
FIG. 2a is a perspective view of a planar and a ring wing.
Figure 2B:
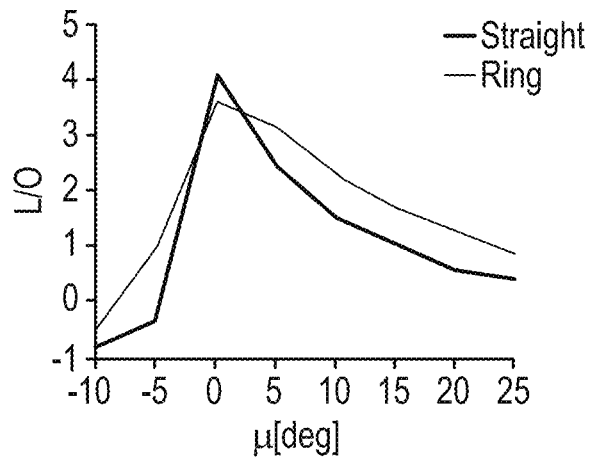
FIG. 2b is a graph of lift-to-drag ratio with respect to angle of attack for a straight and a ring structure.
Figure 3A:
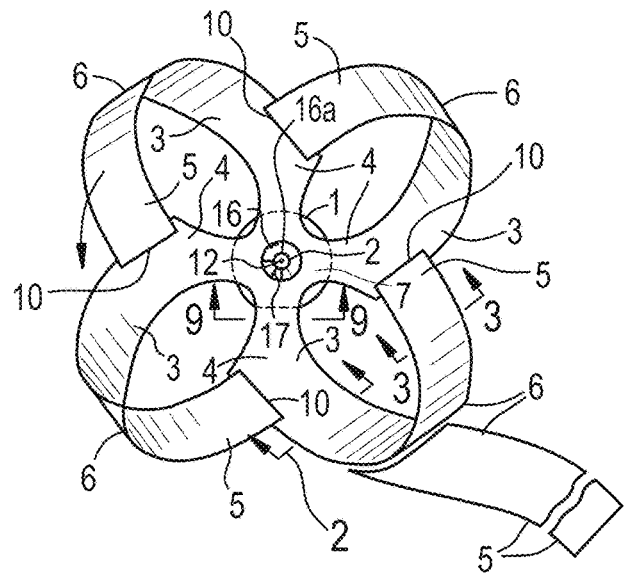
FIGS. 3a, 3b and 3c are prior art propeller designs.
Figure 3B:
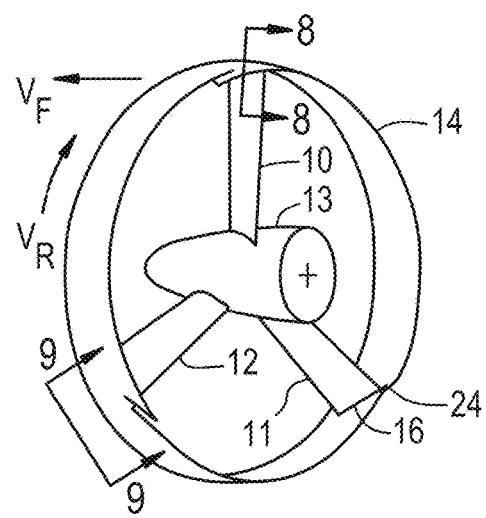
Figure 3C:
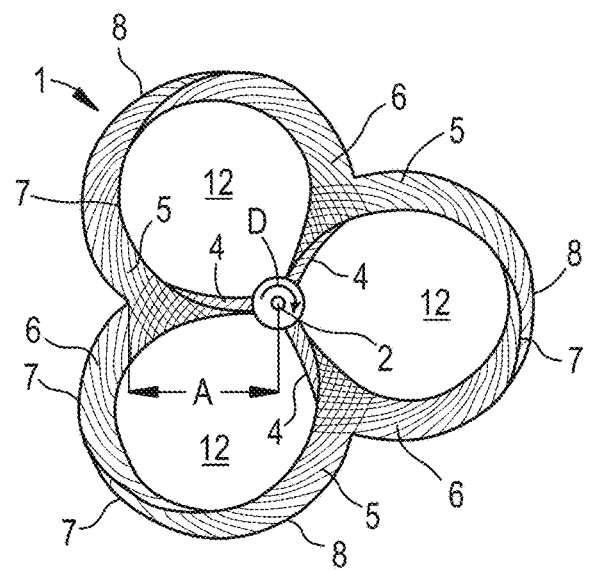
Figure 4A:
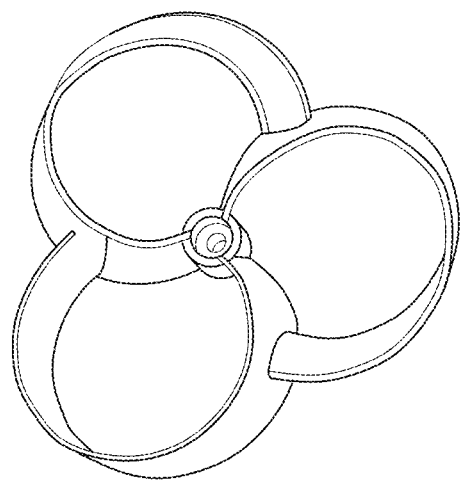
FIG. 4a-FIG. 4f illustrate variations on three-bladed toroidal propeller geometry according to the invention along with conventional comparable (twist distribution) propellers for comparison.
Figure 4B:
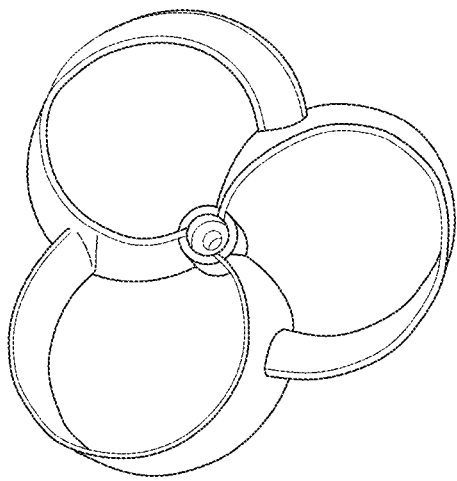
Figure 4C:
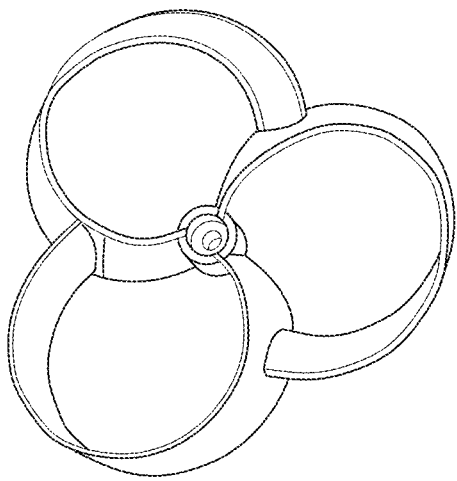
Figure 4D:
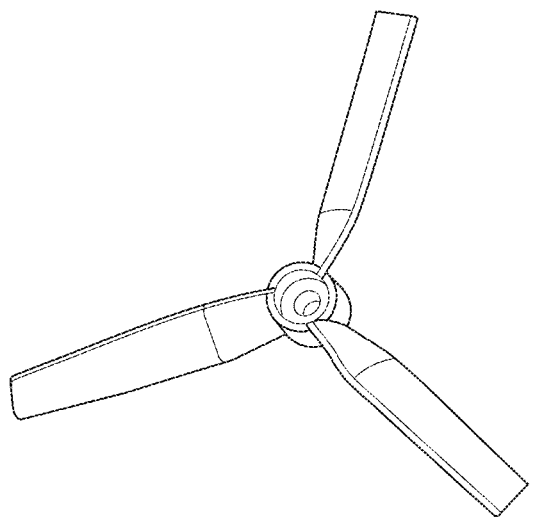
Figure 4E:
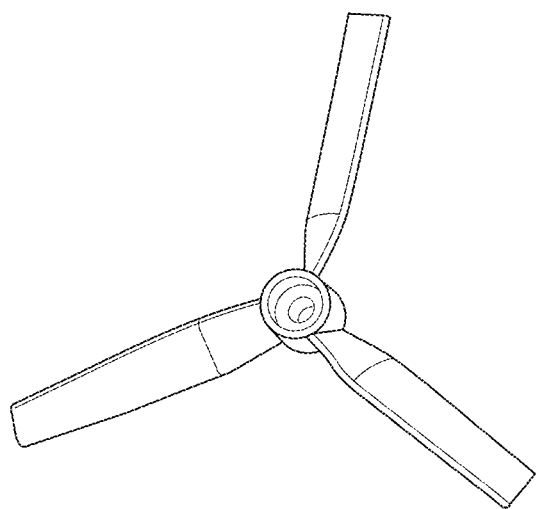
Figure 4F:
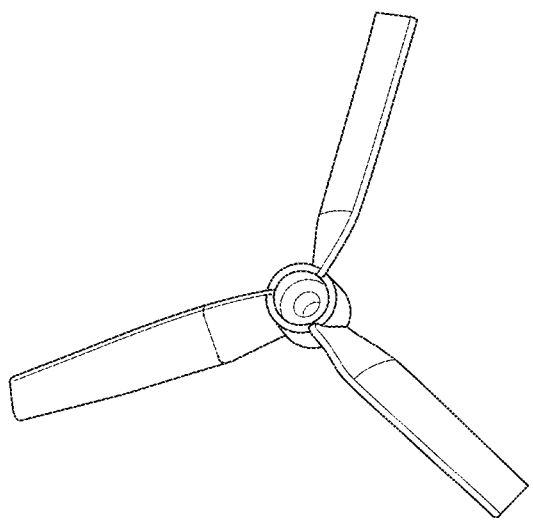
Figure 5A:
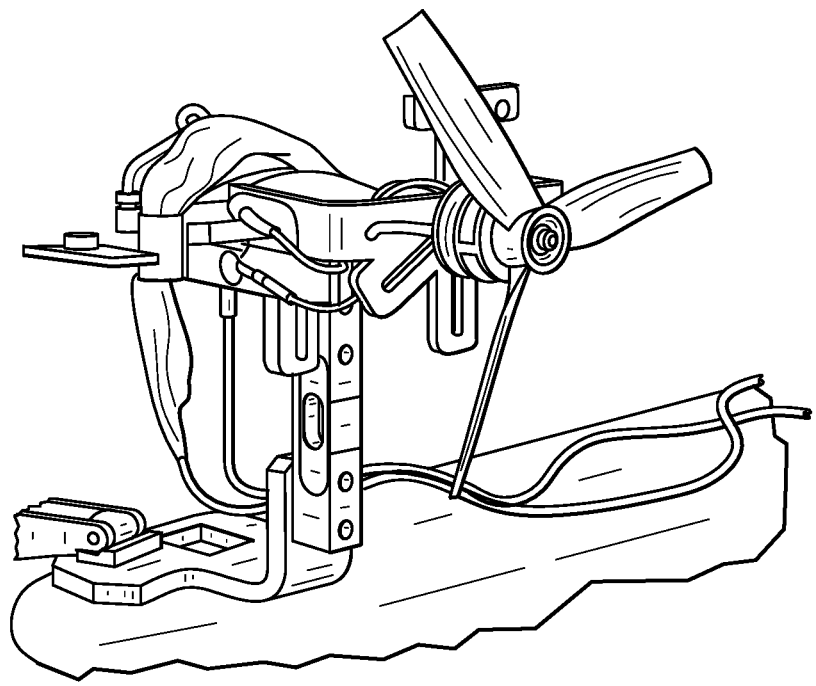
FIG. 5a is a perspective view of a conventional propeller.
Figure 5B:
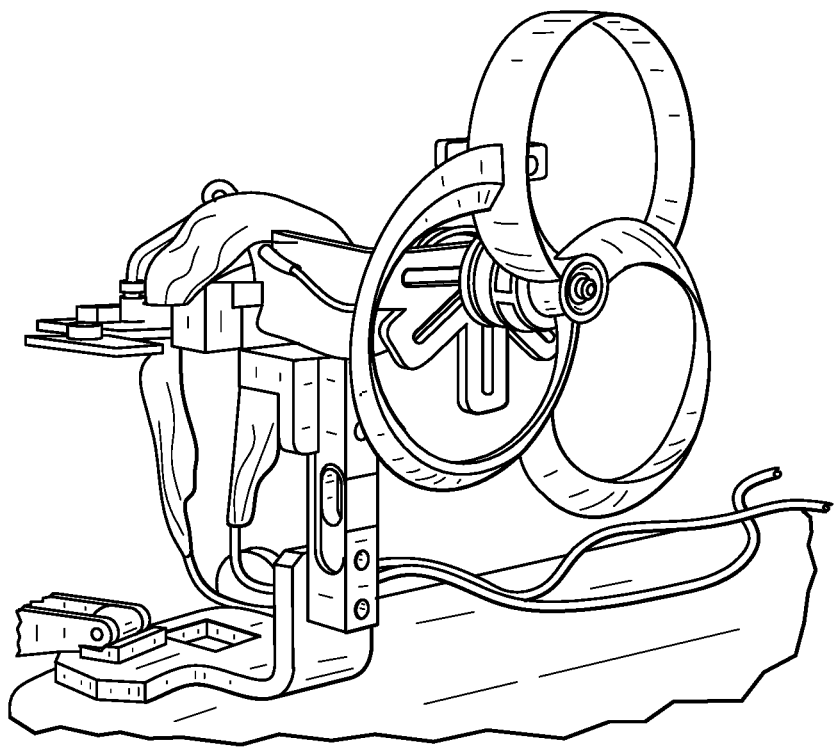
FIG. 5b is a perspective view of an embodiment of a toroidal propeller disclosed herein.

A computer-controlled dynamometer shown in FIGS. 5a and 5b was used to run each of the propellers, collecting torque, thrust and power measurements as a function of propeller speed. A sound meter and microphone were used to collect acoustic response data.

Figure 6:
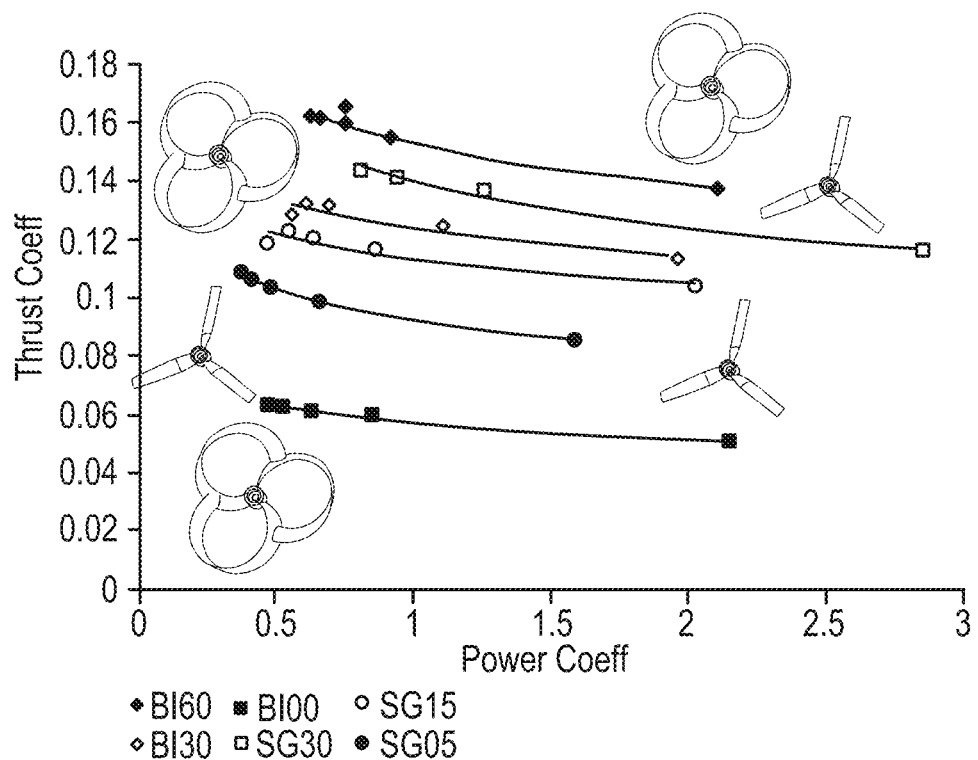
FIG. 6 is a graph of thrust coefficient against power coefficient for tested toroidal and conventional propellers.

To facilitate direct comparison between each of the propellers, the measured data were non-dimensionalized and recomputed as thrust (generated), torque (required), and power (required) coefficients. FIG. 6 illustrates the relative performance of each of the propeller designs with the highest performing toroidal propeller (B160) demonstrating higher efficiencies than the best performing conventional propeller (SG30).

Figure 7:
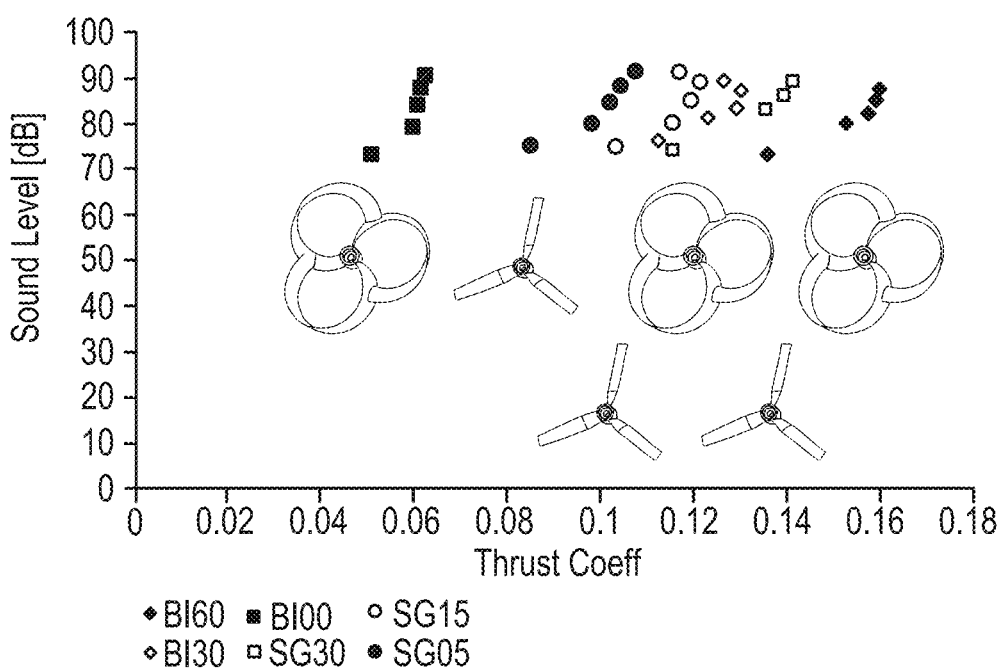
FIG. 7 is a graph of sound level against thrust coefficient for tested toroidal and conventional propellers.

A similar trend appears when assessing acoustic performance. FIG. 7 shows the best toroidal propeller design generating higher thrust at a given sound level than the test conventional design.

Figure 8:
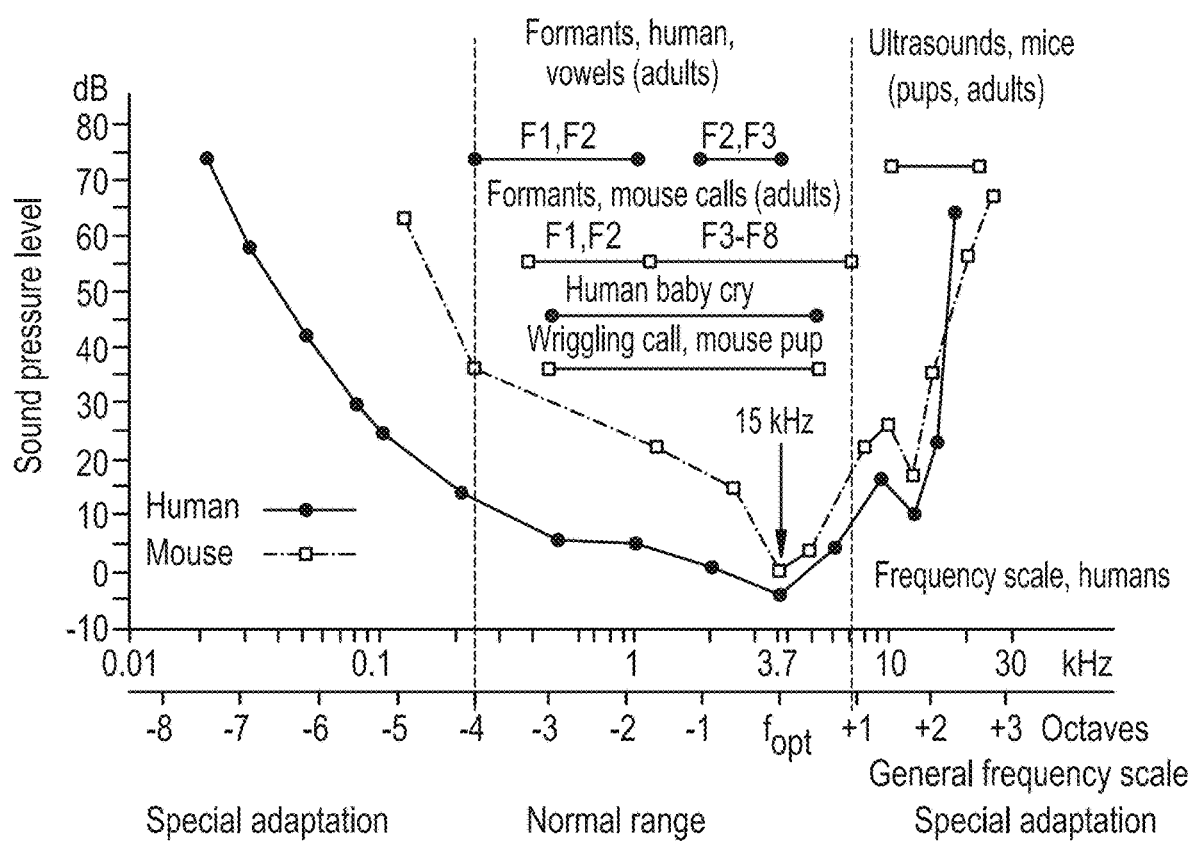
FIG. 8 is a graph showing the relationship between audiograms of humans and house mice and the frequency ranges of their vocalizations.

The frequency content of the noise generated by propellers is critical to assessing their psychoacoustic impact. While the frequency range of human hearing is often quoted as between 20 Hz-20 kHz, the threshold of hearing is a function of tone frequency as shown in the audiogram in FIG. 8. This plot shows that humans are particularly sensitive to tones between 1-5 kHz. It also shows that there is a significant drop-off in audibility as frequency increases.

Figure 9:
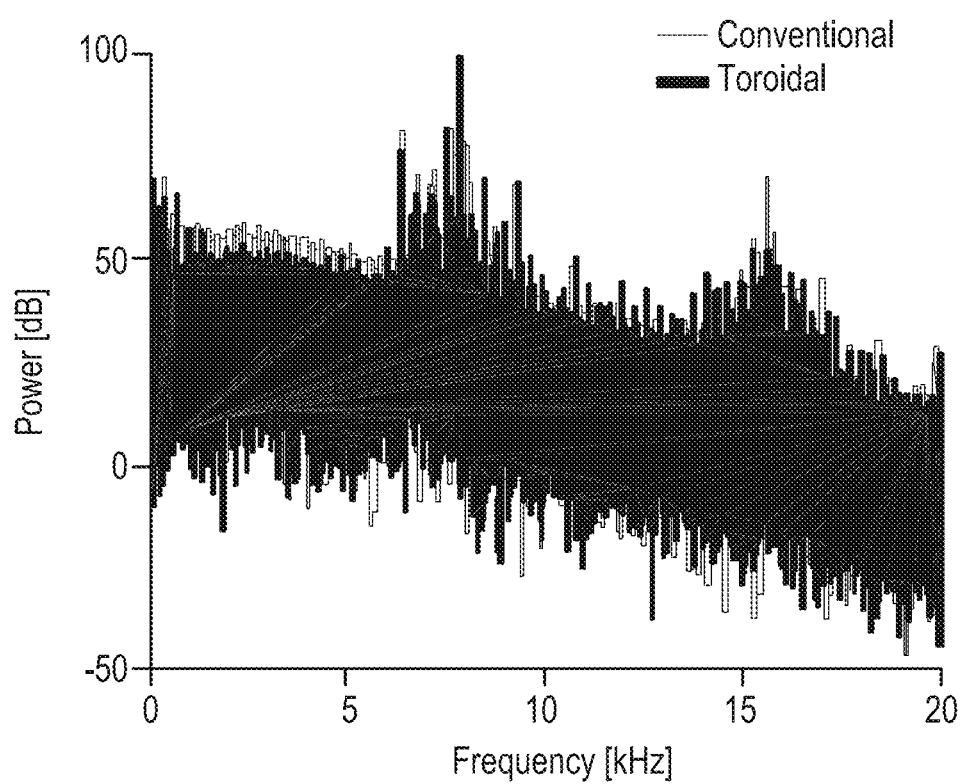
FIG. 9 is a graph of power against frequency for tested conventional and toroidal propellers.

FIG. 9 compares audio signal power spectral density (PSD) of the best performing toroidal and conventional propellers. The acoustic signature of the toroidal propeller of the invention is lower than a conventional propeller across a wide range of frequencies, but more critically, it is significantly lower in the 1-5 kHz range that humans are most sensitive to. Note that this result was achieved without any attempt at optimization or tailoring. Those of ordinary skill in the art will recognize that additional tuning of the propeller material, diameter, number of elements, airfoil cross section, spanwise sweep, and twist distribution may yield additional improvements possibly shifting some fraction of the acoustic energy into higher, less perceptible, frequencies.

A potential toroidal propeller market extends throughout the entire small multirotor drone industry and enables new use cases not before viable due to the noise generated by these platforms. The closed form propeller design of the invention increases its overall structural stiffness and enables reliable fabrication using additive manufacturing techniques thereby allowing for drop-in replaceability with conventional propellers in use on various multirotor drone models and types.

It is recognized that modifications and variations of the present invention will be apparent to those of ordinary skill in the art and all such modifications and variations are included within the scope of the appended claims.

What is claimed is:

1. Toroidal propeller comprising:
   a hub supporting a plurality of elongate propeller elements in which a tip of a leading propeller element curves into contact with a trailing propeller element to form a closed structure with increased stiffness and reduced acoustic signature.

2. The toroidal propeller of claim 1 having two or more propeller elements.

3. The toroidal propeller of claim 1, wherein the plurality of elongate propeller elements comprises three elongate propeller elements.

4. Toroidal propeller comprising:
   a hub supporting a plurality of elongate propeller elements in which a terminal end tip of a leading propeller element curves into contact with a trailing propeller element to form a closed structure with increased stiffness and reduced acoustic signature, with a terminal end of the trailing propeller element curving into contact with the hub.

5. The toroidal propeller of claim 4 having two or more propeller elements.

6. The toroidal propeller of claim 4, wherein the plurality of elongate propeller elements comprises three elongate propeller elements.

7. Toroidal propeller comprising:
   a hub supporting a plurality of elongate propeller elements in which a tip of a leading propeller element of a first elongate propeller element of the plurality of elongate propeller elements curves into contact with a trailing propeller element of a second elongate propeller element of the plurality of elongate propeller elements, the second elongate propeller element being an adjacent elongate propeller element to the first elongate propeller element, to form a closed structure with increased stiffness and reduced acoustic signature,
   wherein an initiation location at which the tip of the leading propeller element is initiated is at a different location than a termination location at which a tip of the trailing propeller element terminates.

8. The toroidal propeller of claim 7 having two or more propeller elements.

9. The toroidal propeller of claim 7, wherein the plurality of elongate propeller elements comprises three elongate propeller elements.

10. Toroidal propeller comprising:
    a hub supporting a plurality of elongate propeller elements, each elongate propeller element having a first terminal end that extends from the elongate propeller element adjacent thereto and a second terminal end that extends from the hub in which a tip of a leading propeller element curves into contact with a trailing propeller element to form a closed structure with increased stiffness and reduced acoustic signature.

11. The toroidal propeller of claim 10 having two or more propeller elements.

12. The toroidal propeller of claim 10, wherein the plurality of elongate propeller elements comprises three elongate propeller elements.

* * * * *